1,930,710

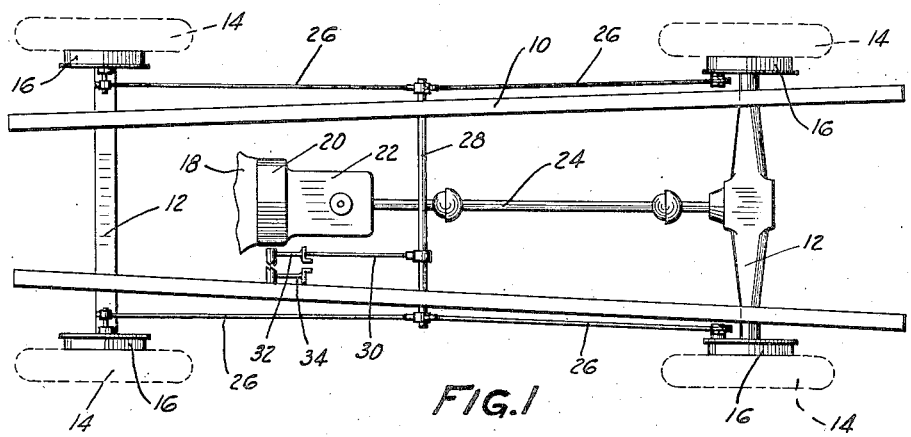
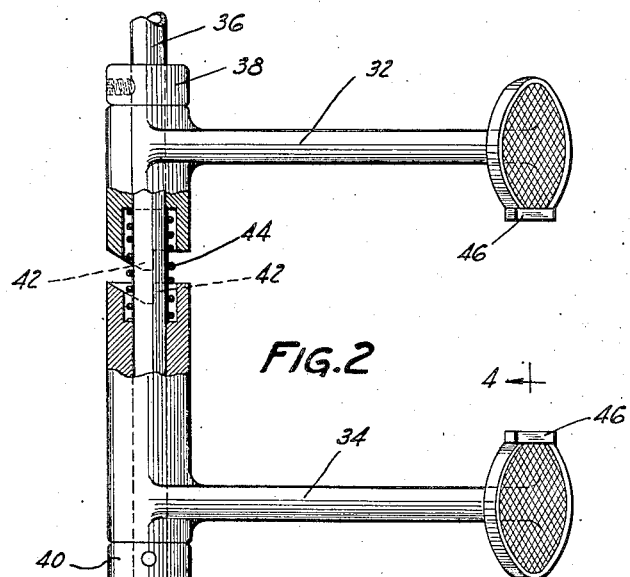
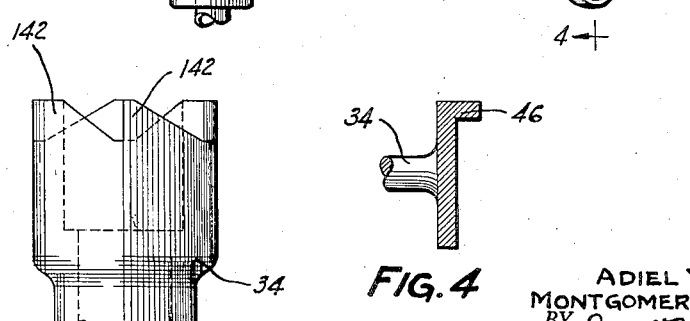
INVENTOR.
ADIEL Y DODGE
MONTGOMERY W. McCONKEY
ATTORNEY Patented Oct. 17, 1933

UNITED STATES PATENT OFFICE 1,930,710

OPERATING MECHANISM

Adiel Y. Dodge and Montgomery W. McConkey, South Bend, Ind., assignors to Bendix Brake Company, South Bend, Ind., a corporation of Illinois Application December 1, 1930. Serial No. 499,256

3 Claims. (Cl. 74—81)

This invention relates to brakes, and is illustrated as embodied in novel brake and clutch control means so arranged that the driver of an automobile may, if he wishes, hold the clutch thrown out and the brakes applied, with one foot, thereby leaving the other foot free to manipulate the accelerator pedal.

In one arrangement illustrated in the drawings, one of the pedals (e. g. the clutch pedal) may be shifted by sidewise pressure of the driver's foot, against a suitable spring, to shift it to a position in which it may hold the other pedal applied. Preferably the hubs of the pedals are formed with interengageable clutch means, such as ratchet teeth, and the shitable pedal may be provided with a lug to be engaged by the side of the driver's foot so that he may shift it readily.

In another arrangement, one of the pedals, preferably the brake pedal, is mounted on its operating member in a manner permitting it to be shifted from a position beside the clutch pedal, where it can be operated in the usual manner, to a position above (or below) the clutch pedal, where both pedals can be manipulated (either independently or together) by one foot.

The above and other objects and features of the invention, including various novel and desirable details of construction, will be apparent from the following description of the two illustrative embodiments shown in the accompanying drawings, in which:

Figure 1 is a top plan view of an automobile chassis embodying one form of our invention;

Figure 2 is a top plan view of the pedals, on a larger scale, and partly broken away;

Figure 3 is a plan view of one end of the hub of a modified form of pedal;

Figure 4 is a section on the line 4—4 of Figure 2, showing the lug at the side of the pedal;

Figure 5:
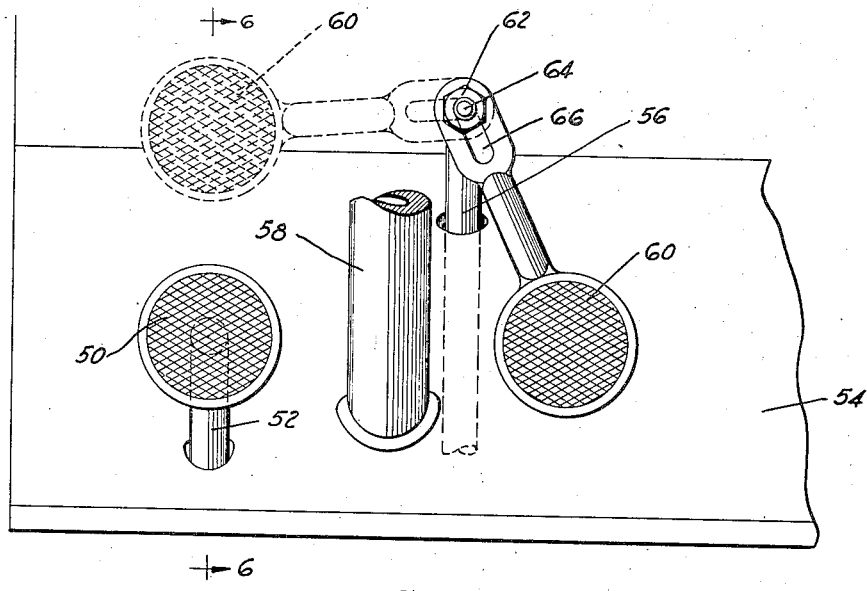
Figure 5 is a rear elevation of part of the floorboard and of modified forms of clutch and brake pedals.

The illustrated chassis includes a frame 10, supported by the usual springs on axles 12 carried by road wheels 14 having brakes 16, and provided with an engine 18 driving the rear wheels through a clutch 20, a transmission 22, and a propeller shaft 24. The brakes are applied by means such as rods or cables 26 from a shaft 28 connected to the brake pedal by means such as a rod 30. The above parts or their equivalents form in themselves no part of the present invention, and may be of any desired construction.

According to the present invention, a pedal 32 operating the brakes and a pedal 34 operating the clutch are so arranged that the driver may, if he wish, hold them both with one foot when the car is stopped on a grade, thereby leaving his other foot free to manipulate the accelerator.

In the arrangement illustrated in Figures 1 and 2, the pedals are coaxially mounted on a supporting shaft 36, between stops 38 and 40, and are provided on the adjacent sides of their hubs with interengageable clutching means such as clutch teeth 42, the hubs being hollowed out to enclose a spring 44 sleeved on the support 36 and compressed and confined between the hubs of the two pedals.

The pad of one of the pedals (i. e. the clutch pedal) is provided at the side next the other pedal with means such as a lug 46 engageable with the side of the driver's foot, so that he may shift the pedal axially to clutch the two pedals together.

In Figure 2 the teeth on the hubs of the pedal are faced to cause the teeth to ride out of engagement upon the depression of the clutch pedal after the brakes are applied by the brake pedal, even if the two pedals were previously clutched together. As shown in Figure 3, if desired teeth 142 may be provided instead of the teeth 42, generally similar thereto but faced in the opposite direction, so that the brake pedal may be depressed after the clutch has been thrown out, even though the pedals are clutched together. And, as shown in Figure 2, the brake pedal may if desired to have a lug or flange 46 also, so that either pedal may be shifted to hold the other.

Figure 6:
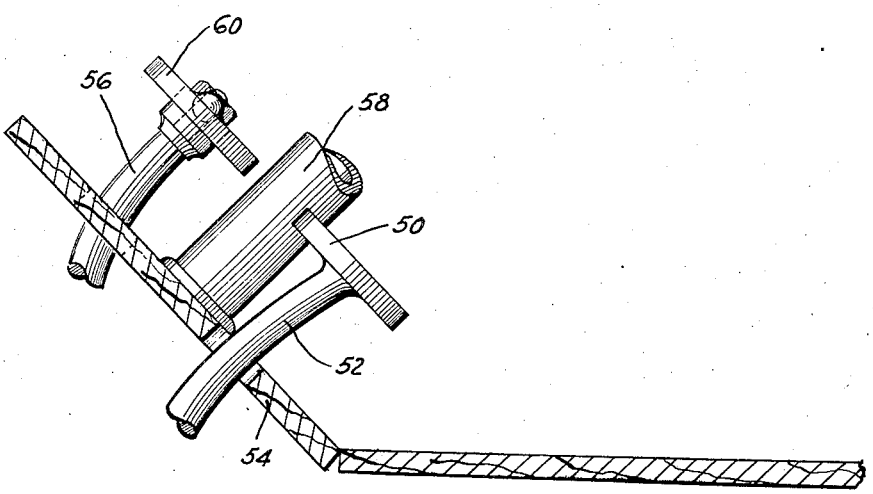
Figure 6 is a section on the line 6—6 of Figure 5, but with the brake pedal shifted to the dotted-line position of Figure 5.

In the arrangement of Figures 5 and 6, the clutch pedal 50 is integral with or secured to an operating member such as a lever 52 which actuates the usual clutch throw-out (not shown), and which passes in the usual manner through an opening in the floor-board 54.

The operating member or lever 56 of the brakes is arranged above the pedal 50, and usually on the opposite side of the steering column 58. The brake pedal 60 is adjustably mounted thereon, for example by means such as a nut 62 threaded on a stud 64 formed on the end of lever 56 and passing through a slot 66 formed in the pedal.

By this arrangement the pedal can be clamped in the full-line position of Figure 5, where it is operated like any other brake pedal; or it can be shifted to the dotted line position, where it can be operated by the driver's left foot either independently of, or simultaneously with, the clutch pedal.

While two illustrative embodiments have been described in detail, it is not our intention to limit the scope of the invention to that particular embodiment, or otherwise than by the terms of the appended claims.

We claim:

1. Coaxial brake and clutch pedals having hubs provided with interengaging means, and having a spring urging said hubs apart and urging said means out of engagement, at least one of said pedals being provided with means operable by the driver to shift the pedal to bring said means into engagement against the resistance of said spring.

2. Coaxial brake and clutch pedals having hubs provided with interengaging means, at least one of said pedals being provided with a part engageable by the driver's foot to shift the pedal to bring said means into engagement.

3. Coaxial brake and clutch pedals having hubs provided with interengaging means, and having a spring urging said hubs apart and urging said means out of engagement.

ADIEL Y. DODGE.
MONTGOMERY W. McCONKEY.